May 1, 1928.
J. F. GAYLORD
1,668,363
TRANSMISSION GEARING
Filed Nov. 29, 1924
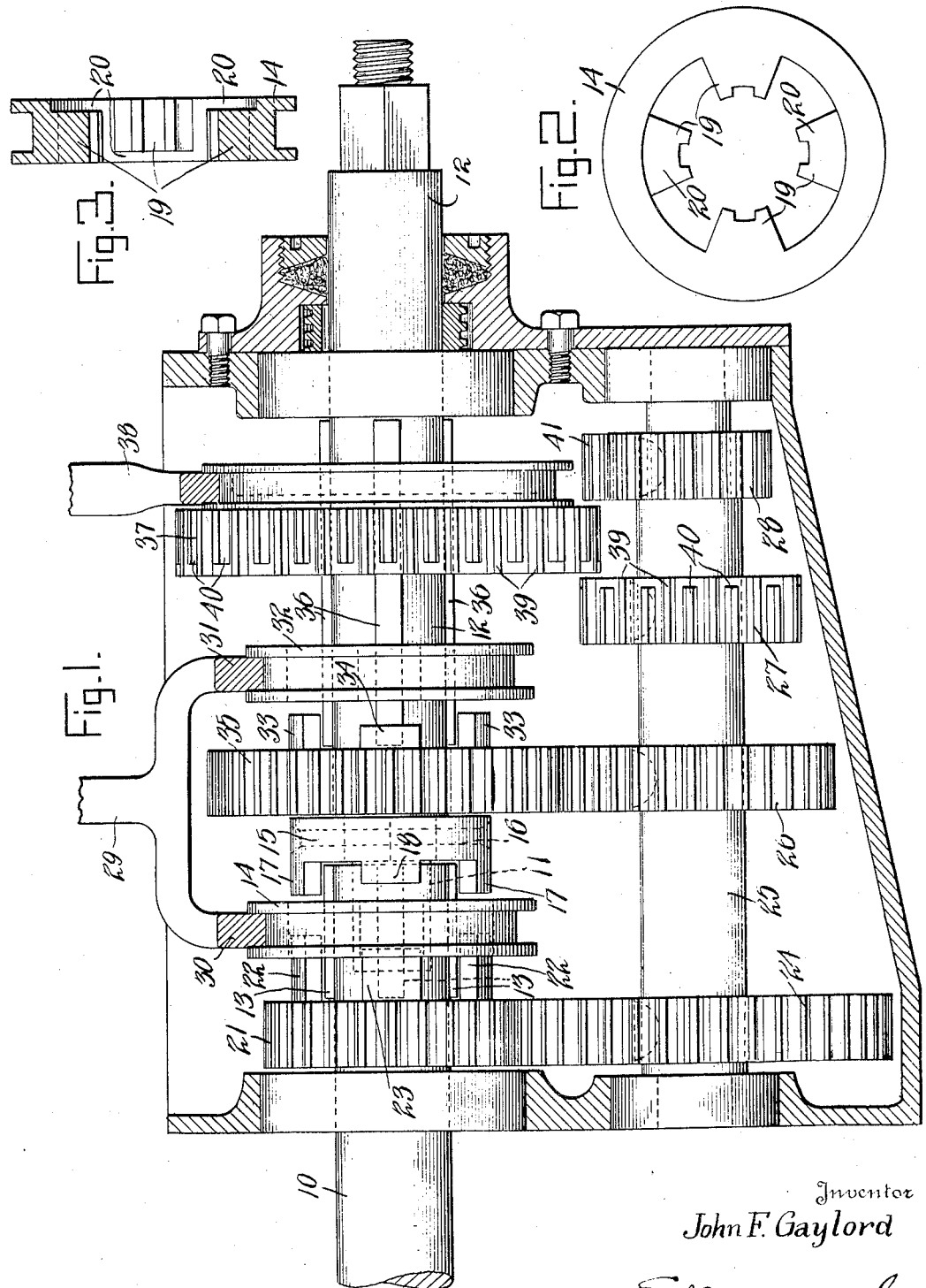
Inventor
John F. Gaylord
By
*[signature]*
Attorney Patented May 1, 1928.

1,668,363

UNITED STATES PATENT OFFICE.

JOHN F. GAYLORD, OF INDIANAPOLIS, INDIANA.

TRANSMISSION GEARING.

Application filed November 29, 1924. Serial No. 752,972.

My said invention relates to a change speed transmission for automobiles and the like and it is an object of the same to provide an improved and simplified arrangement of gearing in which the gears may be shifted without damage at any time regardless of relative speeds of the engine and the vehicle.

Referring to the accompanying drawings which are made a part hereof and on which similar reference characters indicate similar parts, Figure 1 shows a side elevation of my device with the casing in section, Figure 2, a face view of a clutch element forming a part of the invention, and Figure 3, a sectional view of said element.

In the drawing reference character 10 indicates the engine shaft which has a socket indicated in dotted lines at 11, in which socket the reduced end of the transmission shaft 12 is received. The engine shaft has splines at 13 for driving a clutch member 14 slidably mounted on the engine shaft.

A clutch member 15 is fixed to the end of the transmission shaft 12 by means of a pin 16, the end of transmission shaft being squared to fit a squared axial opening in the clutch member 15. As shown in the drawing the clutch member 15 has long clutch-dogs 17 and short clutch-dogs 18 while the clutch member 14 has inwardly-extending clutch-dogs 19 each of which is cut back at one side of the clutch member as indicated at 20 in Figure 3 while at the other side it is flush with the face of the clutch member. When the clutch member 14 is moved toward member 15 the dogs 17, if they strike against faces of dogs 19 flush with the face of clutch member 14, will slip off until they strike against depressed faces 20 at the right-hand side of member 14. Having moved in so far they will make driving engagement with the next long dogs, i. e. those having faces flush with the right-hand face of the clutch member 14 after which the clutching engagement may be perfected by further movement of member 14 to the right. Since the clutch member 15 is fast to the transmission shaft and the clutch member 14 is splined to the engine shaft this will result in a solid engagement between said shafts or a high speed drive for the vehicle.

At the opposite side of the clutch member 14 is a gear 21 loose on the engine shaft which gear has long and short clutch-dogs 22 and 23 respectively for engagement with the teeth 19 on the clutch member 14 in similar manner to that above described these dogs being larger than those on member 15. The gear 21 meshes with a fixed pinion 24 on a countershaft 25. This countershaft also carries successively smaller pinions 26, 27 and 28.

A clutch shifter 29 is provided with a yoke arm 30 engaging a groove in the clutch member 14 for shifting it and another yoke arm 31 engaging a groove in a clutch member 32. The clutch member 32 is similar to clutch member 14 except that the internal dogs are reduced at one side only where they are to engage with the long and short clutch dogs 33, 34 of a gear 35 loose on the transmission shaft 12. The clutch member 32 is splined to the transmission shaft as indicated at 36 and the gear 35 meshes with pinion 26. It will be seen from this that when the shifter 29 is moved to the left from the neutral position shown on the drawing the clutch member 14 drives the gear 21 and thus drives the countershaft and its gears, as well as loose gear 35, but does not drive shaft 12. The shifter 29 will carry the two clutch members 14 and 32 to the left thereby moving the dogs 14 more deeply into engagement with clutch dogs 22 of the gear 21 and also engaging the clutch dogs 33 of gear 35 with clutch member 32. The drive will now be from engine shaft 10 through gears 21, 24, countershaft 25, gears 26 and 35, and transmission shaft 12, i. e. the gearing is in position for the second speed of the vehicle or other mechanism.

To the right of the clutch member 32 a gear 37 is splined to the transmission shaft and an independent shifter 38 is provided for moving the gear lengthwise of the shaft. The gear 37 meshes with the low speed pinion 27 and each of them is provided respectively with long teeth 39 and short teeth 40 (in an axial direction) to secure the same result as described in connection with the clutch members and clutch dogs. When the gears 37 and 27 are in mesh the drive is through shaft 10, gears 21, 24, countershaft 25, and gears 27 and 37 for low speed.

The gear 37 is also adapted to mesh with an idler 41 which is driven by the pinion 28 for driving the vehicle or other mechanism in a reverse direction.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention what I claim as new and desire to secure by Letters Patent is:

1. The combination of a driving shaft, a driven shaft in alinement with the driving shaft, a countershaft, a series of gears of varying size fixed to the countershaft, loose gears on the driving and driven shafts meshing with gears fixed to the countershaft, a clutch member fixed to the end of the driven shaft, a clutch member splined to the driving shaft said clutch member having means for driving engagement either with the loose gear on the driving shaft or with the clutch member on the driven shaft, clutch teeth on said clutch member and said loose gear engaged in the neutral position of the gearing, a clutch member splined on the driven shaft and arranged to effect clutching engagement with the loose gear on said shaft, and a rigid yoke engaging both said splined clutch members for clutching them to the respective loose gears by a movement in one direction, substantially as set forth.

2. The combination of a driving shaft, a driven shaft, a gear loosely mounted on each of said driving and driven shafts, a clutch member mounted on one of said shafts between said gears, a clutch member mounted on each of said shafts and arranged to be moved in one direction into engagement with the gear loose on its respective shaft, one of such clutch members being arranged to engage the clutch member fixed on the shaft between the gears when the said clutch member is moved out of engagement with the respective gear and a rigid yoke engaging both of the clutch members for holding them in fixed spaced relation and arranged to move them in one direction into engagement with the loose gears, substantially as set forth.

3. The combination of a pair of alined shafts, a gear loosely mounted on each of said shafts, connecting means between said loosely mounted gears constantly maintained in fixed relation so that when one is driven the other will also be driven, spaced clutch members maintained in fixed relation one associated with each of said gears, a coacting clutch member on one of the shafts between said spaced clutch members the arrangement being such that when the spaced clutch members are moved in one direction the loose gears will be clutched to their respective shafts and when the clutch members are moved in the opposite direction the shafts will be clutched directly together by engagement of the coacting clutch member by one of the spaced clutch members, substantially as set forth.

In witness whereof, I have hereunto set my hand at Washington, District of Columbia, this twenty-sixth day of November, A. D. nineteen hundred and twenty-four.

JOHN F. GAYLORD.